United States Patent [19]

Stählin et al.

[11] Patent Number: 5,698,660
[45] Date of Patent: Dec. 16, 1997

[54] MELT SPINNABLE COPOLYAMIDES WITH IMPROVED MODULUS OF ELASTICITY, FILAMENTS PRODUCED FROM THEM AND USE OF SUCH FILAMENTS

[75] Inventors: Roland Stählin, Rothenburg; Rolf Hofer, Emmenbrücke, both of Switzerland; Jean Coquard, Grezieu la Varenne, France

[73] Assignee: Rhone-Poulenc Viscosuisse SA, Emmenbrucke, Switzerland

[21] Appl. No.: 649,581

[22] PCT Filed: Sep. 19, 1995

[86] PCT No.: PCT/CH95/00207

§ 371 Date: May 28, 1996

§ 102(e) Date: May 28, 1996

[87] PCT Pub. No.: WO96/10597

PCT Pub. Date: Apr. 11, 1996

[30] Foreign Application Priority Data

Sep. 30, 1994 [SE] Sweden ................................. 2960/94

[51] Int. Cl.⁶ ........................... C08G 69/26; C08G 73/10
[52] U.S. Cl. ........................ 528/310; 528/322; 528/335; 528/337; 528/339; 428/357; 428/395
[58] Field of Search ........................ 528/310, 322, 528/335, 337, 339; 428/395, 357

[56] References Cited

FOREIGN PATENT DOCUMENTS

| 0 041 371 | 12/1981 | European Pat. Off. . |
| 0 615 997 | 9/1994 | European Pat. Off. . |
| WO 91/13930 | 9/1991 | WIPO . |
| WO 92/08827 | 5/1992 | WIPO . |

Primary Examiner—James J. Seidleck
Assistant Examiner—P. Hampton-Hightower
Attorney, Agent, or Firm—Seidel, Gonda, Lavorgna & Monaco, PC

[57] ABSTRACT

A copolyamide with an improved modulus of elasticity for the melt-spinning of filaments consists of at least 75 wt. % of a linear polyamide base polymer with a melting point of 150°–320° C. and at least 0.5 wt. % of a block comonomer which is incorporated into the base polymer and has a glass transition temperature ($T_g$) between 130° and 330° C. and a degree of polymerization (DP) of <100. The filaments produced from the modified copolymer with an initial modulus of 500 to 1500 cN/tex are suitable for use in the production of technical fabrics.

8 Claims, No Drawings

MELT SPINNABLE COPOLYAMINES WITH IMPROVED MODULUS OF ELASTICITY, FILAMENTS PRODUCED FROM THEM AND USE OF SUCH FILAMENTS

The invention concerns a copolyamide with an improved modulus of elasticity for melt-spinning of filaments composed of at least 75% by weight of a linear polyamide base polymer with a melting point of 150°–320° C., and at least 0.5 wt. % of a block comonomer. The invention also concerns filaments produced from the copolyamide, and their use.

For applications in the technical sector, polyamide fabrics are needed which, in general, must be composed of filaments with a high modulus. Fabrics of melt-spinnable filaments of linear polyamides such as polyamide 6.6 or polyamide 6, which would be available as mass produced, exhibit too low an initial modulus for many applications in the technical sector. Such fabrics are therefore preferably produced from aromatic polyamides, so called aramides. Aramide threads cannot be melt spun but must be spun from solution in a costly process. Their production is costly and limited for mass production only for economic considerations. Standard products of polyamides could be used because of their good flexibility, abrasion and adhesion properties but have the disadvantage of a low modulus of elasticity.

There has been no lack of attempts to increase the modulus of elasticity of polyamides. In the systematic study of the random modification approach, however, it was found that the incorporation of (rigid) comonomers in statistical distribution in the best case permitted only a slight increase in the E-modulus. Even the modification of polyamide 6.6 (PA 6.6) with hexahydroterephthalic acid (HHT), which is isomorphous with respect to adipic acid, yielded an improvement of only about 5% compared to standard polymer. Since below 10% co-component rigid molecules already strongly impair the stretchability, it results also in a clearly lower strength in all cases.

From EP-A-0 041 371 a process is known for the production of melt-spinnable polyamides which result in fibers with higher stiffness. Suitable poly-p-phenylene adipamide copolymers, however, can be synthesized only with great difficulty. An increase in the E-modulus is achieved in this case, only by the addition of a great excess of this comonomer due to the reaction sluggishness of the purely aromatic comonomer. In addition, in order to polymerize aromatic diamine comonomers, the reactor must be kept under vacuum during the polyamide synthesis. Therefore, in order to exclude oxygen, vacuum-tight reactors with strong agitators are required.

Another well known semi-aromatic polyamide is the homopolymer poly-m-xylylene adipamide (PMMXD.6). However, the latter is unsuitable for practical use because of its lack of stiffness in the intended field of application.

The purpose of the invention is to devise copolyamides, in which the base polymer is composed of a polyamide such as polyamide 66, polyamide 6, polyamide 6.10, polyamide 6.12; polyamide 6T, polyamide 6I, polyamide MXD.6 or polyamide 4.6, with improved mechanical properties, especially with a higher initial modulus (ATE) (modulus of elasticity), which, for instance, are suitable for production of monofilaments for screen printing fabrics or multifilaments for tire cord fabrics.

The solution to the problem lies therein that the block comonomer incorporated into the base polymer has a glass transition point (Tg) between 130°–330° C. and a degree of polymerization (DP) of less than 100, preferably less than 35.

It has now been found surprisingly that copolymers modified with the block comonomers according to the invention are especially well suited for production of melt-spinnable and high modulus filaments for technical fabrics. In addition, in order to achieve a high initial modulus, a significantly smaller It has now been found surprisingly that copolymers modified with the block comonomers according to the invention are especially well suited for production of melt-spinnable and high modulus filaments for technical fabrics. In addition, in order to achieve a high initial modulus, a significantly smaller quantity of block comonomers is required compared to the random-modification mode.

A co-component of about 0.5% influences the polymer properties only slightly compared to unmodified standard PA. On the other hand the compatibility limits of such rigid block comonomers with the flexible PA matrix is about 25%.

Block comonomers of the following general formula have been found to be especially suitable:

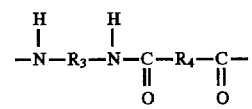

It is advisable if the substituents $R_3$ and/or $R_4$ have the following structures:

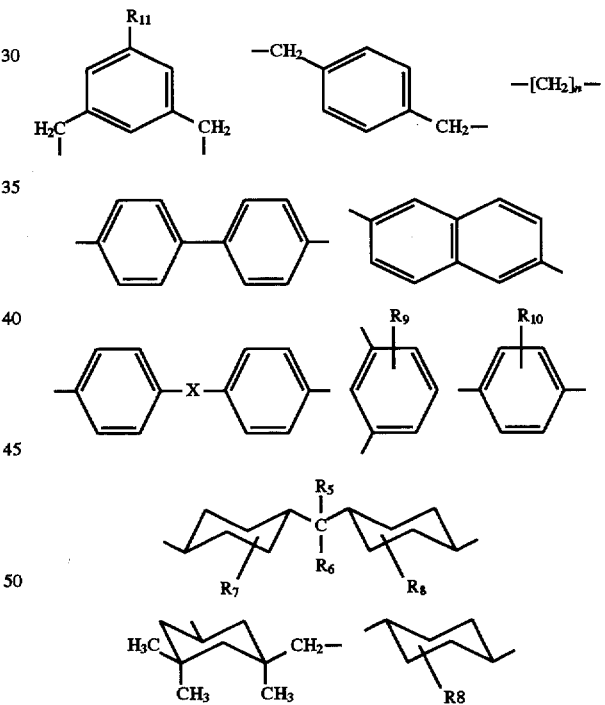

in which $R_5$, $R_6$, $R_8$, $R_9$, $R_{10}$ and $R_{11}$ signify H, alkyl, aryl, —O—alkyl or —O—aryl; n=2–8; and x signifies $C(CH_3)_2$, O, $SO_2$, or S.

It is further advisable that the filaments produced from a copolyamide have the following properties:

a tensile strength (Ft) of 55–120 cN/tex an elongation (Dt) of 10–30% an initial modulus (AE) of 500–1500 cN/tex.

The filaments according to the invention are used for production of technical fabrics, e.g. for screen printing fabrics and tire cord fabrics.

The invention will be described with reference to the examples.

1. Production of the block comonomers: Method I

All blocks synthesized by this process are produced in solution by using the corresponding acid chlorides and diamines in N-methyl-2-pyrrolidone (NMP). The synthesis process, regardless of what educts are used, remains identical. The following instructions for the production of MXD.BIA serve as an example of synthesis.

In a reactor 6 l of NMP, 1150 ml of triethylamine and 546 g of m-xylylene diamine (MXD) are cooled in a reactor to about 0° C. (ice bath). With strong agitation, 1135 g of 5-tert.butyl-isophthalic acid-dichloride (BIA), including a 10% excess, are introduced in such a way that the temperature does not exceed 100° C. This generally lasts 10–15 minutes. After standing overnight this semitransparent solution is poured with vigorous stirring as a thin stream into 15 l of hot water (about 90° C.). This is left to stand overnight. The creamy, almost granular, suspension is divided between two filter stockings, filtered and separated by a centrifuge for about 5–10 min. It is suspended with hot water and centrifuged 3 more times.

This batch suspended in AH salt solution can be polymerized directly in an autoclave during the production of polyamide 6.6. However, the batch, for drying after said hot water suspension, can also be filtered, separated by centrifuge and dried in a vacuum drier at 90° C. under an operating vacuum. The yield is 93% of theoretical.

2. Synthesis of the block comonomer: Method II

Block comonomers according to the invention may also be produced directly, i.e. without the indirect path with acid chloride in DMEU as the solvent. The following instructions serve to illustrate the synthesis of MXD.BIA as a representative example for all comonomer blocks realized by this method II.

Weighed quantities:
MXD (m-xylylene aliamine): 754.7 g (5.55 mol)
BIA (t-butyl-isophthalic acid): 1232 g (5.55 mol)
DMEU (dimethylethylurea): 2.7 l
$H_3PO_2$ (50%): 1.8 g The weighed quantities (without $H_3PO_2$) are poured into a 10 l glass reactor and covered with $N_2$ while stirred (60 rpm). The reaction container is provided with electrical heating and an anchor type agitator blade (Inox). The reaction mass is successively heated thus improving the stirability. When 100° C. is reached (after about 30 minutes) the stated quantity of $H_3PO_2$ is mixed in. After another about 40 minutes of heating the distillation of water begins from 193° C. The distillate volume of 200 ml, which corresponds to the theoretically expected quantity, is achieved after about 1 hour at a reaction mass temperature of 232° C. Another distillation period of 1 hour at 233° C. follows, during which another fraction of 207 ml is collected. The total distillation time is 3 hours. After cooling the reaction mass to 210° C., the hot reaction mass is introduced through a peristaltic pump with vigorous stirring (POLYTRON agitator) into 30 l of water. The polymer at this time falls out as a precipitate. The synthesis of the block comonomers is subsequently completed by the following operations:

centrifugal filtration (glass filter SOVIREL, n° 4); washing; suspension in 20 l of $H_2O$ with vigorous stirring (10 minutes); filtration; washing; suspension in 20 l $H_2O$ for 1 hour; filtration; washing with 60 l $H_2O$; drying: 40 hours/ 120° C./40 mmHg, and 15 hours/120° C./0.5 mmHg Yield: 1787 g (98% of theoretical)

Block comonomer characterization:

| | |
|---|---|
| IV = 30 ml/g | (Measurement in m-cresol at 25° C., weighed quantity = 0.5%) |
| Tg = 201° C. | (DSC, 10 K/min, $N_2$, value after 4th passage = stable) |
| Mn = 7628 g/mole | calculated from: CEG = 138.3–140.6 mole/t AEG = 121.5–124 mole/t |

3. Other examples synthesized by Method II

TABLE 1

| Trial Number | Designation | Molar weight (g/mol) | Tg (°C.) | $RVH_2SO_4$ | AEG mol/t | CEG mol/t |
|---|---|---|---|---|---|---|
| V1 | MXD.BIA | 7500 | 156 | 1.33 | 123 | 140 |
| V2 | IPD.I | 7000 | 246 | 1.23 | 190 | 180 |
| V3 | DDCM.I | 7000 | 250 | 1.22 | 450 | 466 |
| V4 | MXD.I | 14000 | 162 | 1.43 | 97 | 136 |
| V5 | MXD.BIA | 1700 | — | 1.13 | 7 | 980 |
| V6 | IPD.BIA | — | 265 | — | — | — |
| V7 | DDCM.BIA | — | 275 | — | — | — |

$T_g$=glass transition point

RV=relative viscosity

AEG=amino end groups

CEG=carboxy end groups

4. Production of block copolyamides

All block copolyamides are synthesized by the same method: with agitation (Turax) 1200 g of block comonomer are suspended in 9 kg of AH salt solution. A possibly unequal AEG/CEG ratio of block comonomer is corrected with HMD or adipic acid, respectively. Then the block comonomer suspended in the AH salt solution is pretreated for 3 hours at 170° C. contents temperature in an autoclave. In certain cases the addition of an antifoaming agent is advantageous. The volume of the total quantity introduced should not exceed 2/3 of the autoclave volume so that the initially occurring foam does not plug up the conduit. After a dwell-time for the contents of 3 hours at 170° C., the 8 kg of AH salt solution added to the AK [autoclave] were still lacking for a full charge and the autoclave is heated further. The concentration phase is conducted at 115°–125° C. and 1 bar abs. The final temperature before discharge is 278°–280° C.

The results of polycondensation are reproduced in Table 2.

TABLE 2

| Example | Designation block CoPA | RV above AK | RV above NK | AEG above AK (mol/t) | CEG above AK (mol/t) | 2nd Tf (°C.) | Tc (°C.) | Tc (°C.) |
|---|---|---|---|---|---|---|---|---|
| 1 | 66(reference) | 45 | 75 | 53.0 | 55.0 | 262.0 | 261.0 | 217 |
| 2 | 66/MXD.BIA 97:3 | 44.2 | 79.0 | 49.3 | 50.7 | 263.7 | 260.6 | 219 |
| 3 | 66/MXD.BIA 94:6 | 40.9 | 72.7 | 50.1 | 55.3 | 260.3 | 257.6 | 217 |
| 4 | 66/MXD.BIA 90:10 | 37.9 | 68.4 | 43.7 | 74.0 | 257.3 | 254.9 | 213 |
| 5 | 66/MXD.BIA/6.HHT 88:6:6 | 43.5 | 77.0 | 47.0 | 66.9 | 262.2 | 261.6 | 229 |
| 6 | 66/MXD.BIA 90:10 | 33.5 | 44.2 | 87.4 | 30.0 | 256.0 | 253.5 | 221 |
| 7 | 66/MXD.BIA 90:10 | 34.7 | 68.8 | 83.0 | 34.3 | 255.9 | 254.7 | 219 |
| 8 | 66/MXD/BIA 90:10 | 38.2 | 91.8 | 46.8 | 60.7 | 257.2 | 254.9 | 212 |
| 9 | 66/MXD.BIA 90:101 | 28.4 | 49.8 | 27.1 | 103 | 255.2 | 253.6 | 211 |
| 10 | 66/MXD.BIA 90:10 | 39.4 | 99.5 | 49.3 | 55.3 | 257.6 | 254.6 | 214 |
| 11 | 66/IPD.I 90:10 | 36.9 | 62.3 | 64.0 | 41.2 | 237.8 | 256.7 | 215 |
| 12 | 66/MXD.I 90:10 | 41.8 | 92.2 | 56.9 | 39.0 | 255.8 | 252.1 | 207 |

Table 2 contains an overview of the block CoPA according to the invention.

MXD=metaxylylene diamine
BIA=t-butylisophthalic acid
IPD=isophoron diamine
HHT=hexahydroterephthalic acid 5. Post-condensation Post-condensation is conducted under high vacuum in the tumbler. After a post-condensation time of 4 hours under a high vacuum of 0.8 mbar, the temperature must be between 190° and 250° C. in order to achieve an RV of about 75.

TABLE 3

| Designation block CoPA | Predrying BV ≈ 80 mbar h/°C. | Post-condensation HV 0.8 mbar h/°C. | VI above AK | VI after NK |
|---|---|---|---|---|
| 66/DDCM.I 90:10 | 2 h/140° C. | 4 h/196° C. | 40.6 | 74.1 |
| 66/MXD.BIA 90:10 | 2 h/140° C. | 4 h/196° C. | 37.9 | 68.4 |
| 66/MXD.BIA 94:6 | 2 h/140° C. | 4 h/190° C. | 40.9 | 72.7 |
| 66/MXD.BIA 97:3 | 2 h/140° C. | 4 h/190° C. | 44.2 | 79.0 |

TABLE 3-continued

| Designation block CoPA | Predrying BV ≈ 80 mbar h/°C. | Post-condensation HV 0.8 mbar h/°C. | VI above AK | VI after NK |
|---|---|---|---|---|
| 66/IPD.I 90:10 | 2 h/140° C. | 4 h/196° C. | 36.9 | 62.3 |

Table 3 shows examples of post condensations on a minitumbler.

6. Spin stretching

All block copolyamides were spun by the same process. Example: block copolyamide 66/MXD.BIA with variable co-components was melted by known methods and spun with a throughput of 3 kg/hour in an extruder to a model titer of 200f30. The spinning parameters were:

Spinning parameters

Melt temperature: 285°–287° C. b. 600 m/Min.
(after extruder) 289°–291° C. b. 1000 m/Min.
Block temperature: 295° C.
Spinneret temperature: 320° C.
(6 cm) hot collar temperature 340° C.

The results are listed in Table 4.

TABLE 4

| | Stretching | | DT % | | Ft (cN/tex) | | LASE 0.8% (cN/tex) | | TS 190° C. (%) | |
|---|---|---|---|---|---|---|---|---|---|---|
| | RV Ball | ratio 3) | 600 2) | 1000 2) | 600 2) | 1000 2) | 600 2) | 1000 2) | 600 2) | 1000 2) |
| PA66 1) | 75 | 4.6 | 14 | 14 | 84 | 73 | 470 | 455 | 8.0 | 7.4 |
| 3% MXD.BIA (LP93/042) | 80 | 4.3 | 13.5 | 13.5 | 75 | 66 | 525 | 495 | 9.1 | 8.5 |
| 6% MXD.BIA (LP 93/041) | 78 | 3.6 | 14.5 | 14.5 | 57 | 45 | 555 | 505 | 10.4 | 9.6 |
| 10% MXD.BIA (LP 93/040) | 63 | 3.9 | 14 | 16.5 | 58 | 48 | 595 | 545 | 12.2 | 11.2 |
| 6% MXD.BIA + 6% 6.HHT (LP 93/043) | 70 | 4.0 | 14 | 15 | 58 | 42 | 490 | 450 | 9.7 | 0.9 |

1) Standard
2) Spinning speed (m/min)
3) Goal: residual elongation of 15% ± 2

Table 4 shows the dependence of thread properties on the increasing co-component as exemplified by block CoPA 66/MXD.BIA.

In the following Table 5 are summarized the properties of the stretched copolyamides threads in which PA 6.6 is modified with 10% by weight of various block copolyamides according to the invention.

TABLE 5

| Trial No. | RV | I/Io 3) | Dt(%) 600 2) | Dt(%) 1000 2) | Ft (cN/tex) 600 2) | Ft (cN/tex) 1000 2) | Init. modulus (cN/tex) LASE = 0.8% 600 2) | Init. modulus (cN/tex) LASE = 0.8% 1000 2) | Init. modulus (cN/tex) LASE = 2% 600 2) | Init. modulus (cN/tex) LASE = 2% 1000 2) | TS(%) |
|---|---|---|---|---|---|---|---|---|---|---|---|
| V1 | 55 | 4.5 | 17 | 13.3 | 60.4 | 61.2 | 640 (+52.4%) | 675 | 680 | 715 | 13.8 |
| V2 | 77 | 3.8 | 16.8 | 17 | 55 | 48.7 | 595 (+41.7%) | 605 | 625 | 630 | 13.4 |
| V3 | 47 | 4.7 | 15.1 | 14.4 | 65.2 | 66.2 | 640 (+52.4%) | 655 | 665 | 680 | 13.9 |
| V4 | 71 | 4.6 | 14.5 | 12.1 | 68.8 | 64.3 | 625 (+48.8%) | 630 | 660 | 665 | 14.3 |
| V5* | 81 | 4.6 | 15.6 | 13.4 | 80 | 78 | 420 | 475 | 370 | 440 | 8.2 |

*Reference: PA 6.6 not modified

From Table 5 one sees that the initial modulus of all variants is about 50% above that of the reference (V5). The fabric produced with the monofilaments according to the invention is exceptionally well suited for use in technical fabrics.

We claim:

1. A block copolyamide with an improved modulus of elasticity for melt spinning of filaments comprising at least 75% by weight of a linear polyamide base polymer with a melting point of 150°–320° C. and at least 0.5 wt. % of a block comonomer, wherein the block comonomer incorporated into the base polymer has a glass transition temperature between 130° and 330° C. and a degree of polymerization of less than 100.

2. A block copolyamide according to claim 1, wherein the polyamide base polymer has the formula:

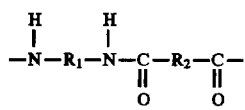

in which $R_1$ and $R_2$ correspond to a linear or branched alkyl or aryl substituent.

3. A block copolyamide according to claim 1, wherein the block comonomer has the formula:

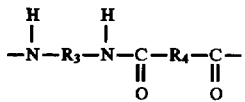

in which $R_3$ and/or $R_4$ have the following structures:

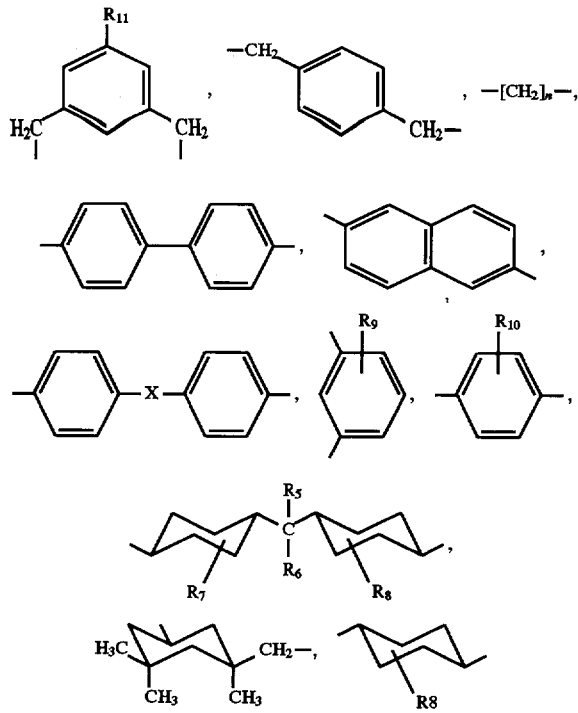

in which $R_5$, $R_6$, $R_8$, $R_9$, $R_{10}$ and $R_{11}$ signify H, alkyl, aryl, —O—alkyl or —O—aryl; n=2–8; and X signifies $C(CH_3)_2$, O, $SO_2$, or S.

4. A filament produced from the block copolyamide according to claim 1, said filament having the following properties:

a tensile strength of 55–120 cN/tex;
an elongation of 10–30%; and
an initial modulus of 500–1500 cN/tex.

5. A filament produced from the block copolyamide according to claim 2, said filament having the following properties:

a tensile strength of 55–120 cN/tex;

an elongation of 10–30%; and an initial modulus of 500–1500 cN/tex.

6. A filament produced from the block copolyamide according to claim 3, said filament having the following properties:

a tensile strength of 55–120 cN/tex;

an elongation of 10–30%; and an initial modulus of 500–1500 cN/tex.

7. A block copolyamide according to claim 3 wherein $R_3$ and $R_4$ are selected from the group consisting of:

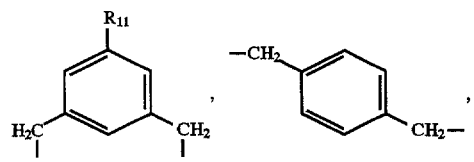, 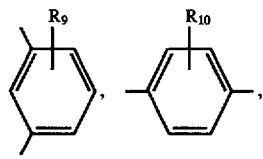, $-[CH_2]_n-$,

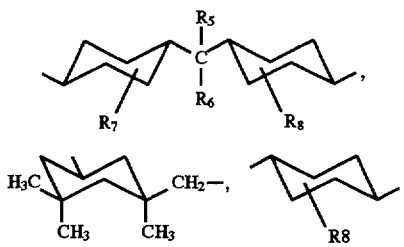

in which $R_5$, $R_6$, $R_8$ and $R_{11}$ are selected from the group consisting of H, alkyl, aryl, —O—alkyl and —O—aryl; $R_9$ and $R_{10}$ are selected from the group consisting of alkyl, aryl, —O—alkyl and —O—aryl; and n=2–8.

8. A filament produced from the block copolyamide according to claim 7, said filament having the following properties:

a tensile strength of 55–120 cN/tex;

an elongation of 10–30%; and an initial modulus of 500–1500 cN/tex.

* * * * *

UNITED STATES PATENT AND TRADEMARK OFFICE
CERTIFICATE OF CORRECTION

PATENT NO. : 5,698,660

DATED : December 16, 1997

INVENTOR(S) : Roland Stählin et al.

It is certified that error appears in the above-identified patent and that said Letters Patent is hereby corrected as shown below:

Title page item [54], and column 1, change "COPOLYAMINES" to --COPOLYAMIDES--.

Face page, under the heading "[30] Foreign Application Priority Data", change "[SE] Sweden" to --[CH] Switzerland--.

Col. 2, line 6, after "smaller" add --quantity of block comonomers is required compared to the random-modification mode.--

Signed and Sealed this

Thirty-first Day of March, 1998

Attest:

BRUCE LEHMAN

Attesting Officer

Commissioner of Patents and Trademarks